(12) United States Patent
Hines et al.

(10) Patent No.: US 8,290,505 B2
(45) Date of Patent: Oct. 16, 2012

(54) CONSEQUENTIAL LOCATION DERIVED INFORMATION

(75) Inventors: Gordon John Hines, Kirkland, WA (US); Will Cousins, Seattle, WA (US)

(73) Assignee: TeleCommunications Systems, Inc., Annapolis, MD (US)

( * ) Notice: Subject to any disclaimer, the term of this patent is extended or adjusted under 35 U.S.C. 154(b) by 364 days.

(21) Appl. No.: 11/511,454

(22) Filed: Aug. 29, 2006

(65) Prior Publication Data

US 2008/0057975 A1    Mar. 6, 2008

(51) Int. Cl.
H04W 24/00    (2009.01)
H04W 4/00    (2009.01)

(52) U.S. Cl. .................. 455/456.1; 455/435.1; 455/414; 455/433

(58) Field of Classification Search ............... 455/221.1, 455/435.1, 433, 404.2, 414.2, 456.2, 456.3, 455/414, 456.1; 709/245
See application file for complete search history.

(56) References Cited

U.S. PATENT DOCUMENTS

| | | |
|---|---|---|
| 1,103,073 A | 7/1914 | O'Connel |
| 4,445,118 A | 4/1984 | Taylor |
| 4,494,119 A | 1/1985 | Wimbush |
| 4,651,156 A | 3/1987 | Martinez |
| 4,868,570 A | 9/1989 | Davis |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,166,972 A | 11/1992 | Smith |
| 5,432,841 A | 7/1995 | Rimer |
| 5,835,907 A | 11/1998 | Newman |
| 6,032,051 A * | 2/2000 | Hall et al. ............ 455/518 |
| 6,067,045 A | 5/2000 | Castelloe |
| 6,104,931 A | 8/2000 | Havinis et al. |
| 6,108,533 A * | 8/2000 | Brohoff ............ 455/414.3 |
| 6,134,316 A | 10/2000 | Kallioniemi |
| 6,138,003 A | 10/2000 | Kingdon et al. |
| 6,181,939 B1 | 1/2001 | Ahvenainen |

(Continued)

FOREIGN PATENT DOCUMENTS

WO    WO01/45342    6/2001

(Continued)

OTHER PUBLICATIONS

Yilin Ahao, Efficient and reliable date transmission for cellular and GPS based mayday systems, Nov. 1997, IEEE, IEEE Conference on Intelligent Transportation System, 1997. ITSC 97, 555-559.

(Continued)

Primary Examiner — Kent Chang
Assistant Examiner — Kuo Woo
(74) Attorney, Agent, or Firm — William H. Bollman

(57) ABSTRACT

The number of messages required in networks where location services are deployed may be reduced, by providing updated location information regarding particular subscribers, or even all subscribers, to subscribed or otherwise logged applications or services upon obtaining and providing location information for a different application or service. Consequential watch services in accordance with the principles of the present invention provide location information to one or more services OTHER than or in ADDITION to the service currently requesting location information, based on subscription to a suitable service.

20 Claims, 4 Drawing Sheets

U.S. PATENT DOCUMENTS

| | | |
|---|---|---|
| 6,185,427 B1 | 2/2001 | Krasner |
| 6,253,074 B1 | 6/2001 | Carlsson |
| 6,278,701 B1 | 8/2001 | Ayyagari |
| 6,321,092 B1 * | 11/2001 | Fitch et al. ................. 455/456.5 |
| 6,330,454 B1 | 12/2001 | Verdonk |
| 6,360,102 B1 | 3/2002 | Havinis |
| 6,377,810 B1 | 4/2002 | Geiger et al. |
| 6,397,208 B1 | 5/2002 | Lee |
| 6,427,001 B1 | 7/2002 | Contractor |
| 6,526,026 B1 | 2/2003 | Menon |
| 6,529,500 B1 | 3/2003 | Pandharipande |
| 6,539,232 B2 | 3/2003 | Hendrey et al. |
| 6,553,236 B1 | 4/2003 | Dunko |
| 6,564,261 B1 | 5/2003 | Gudjonsson |
| 6,580,390 B1 | 6/2003 | Hay |
| 6,587,691 B1 * | 7/2003 | Granstam et al. ........... 455/456.1 |
| 6,600,927 B2 | 7/2003 | Hamilton |
| 6,618,593 B1 | 9/2003 | Drutman |
| 6,621,810 B1 | 9/2003 | Leung |
| 6,687,504 B1 | 2/2004 | Raith |
| 6,694,351 B1 | 2/2004 | Shaffer |
| 6,731,940 B1 * | 5/2004 | Nagendran ................. 455/456.1 |
| 6,744,858 B1 | 6/2004 | Ryan |
| 6,757,545 B2 | 6/2004 | Nowak et al. |
| 6,771,971 B2 | 8/2004 | Smith |
| 6,775,255 B1 | 8/2004 | Roy |
| 6,775,267 B1 | 8/2004 | Kung |
| 6,775,534 B2 | 8/2004 | Lindgren |
| 6,795,444 B1 | 9/2004 | Vo |
| 6,813,264 B2 | 11/2004 | Vassilovski |
| 6,839,417 B2 | 1/2005 | Weisman |
| 6,847,618 B2 | 1/2005 | Laursen |
| 6,876,734 B1 | 4/2005 | Summers |
| 6,882,850 B2 | 4/2005 | McConnell et al. |
| 6,885,874 B2 | 4/2005 | Grube |
| 6,912,230 B1 | 6/2005 | Salkini |
| 6,940,826 B1 | 9/2005 | Simard |
| 6,940,950 B2 | 9/2005 | Dickinson et al. |
| 6,957,068 B2 | 10/2005 | Hutchinson |
| 6,968,044 B2 | 11/2005 | Beason |
| 6,985,747 B2 | 1/2006 | Chithambaram |
| 6,993,355 B1 | 1/2006 | Pershan |
| 7,072,667 B2 | 7/2006 | Olrik |
| 7,106,717 B2 | 9/2006 | Rousseau et al. |
| 7,110,773 B1 * | 9/2006 | Wallace et al. ............ 455/456.1 |
| 7,113,128 B1 | 9/2006 | Pitt |
| 7,136,466 B1 | 11/2006 | Gao |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,200,380 B2 | 4/2007 | Havlark |
| 7,245,900 B1 | 7/2007 | Lamb |
| 7,246,187 B1 | 7/2007 | Ezra |
| 7,260,186 B2 | 8/2007 | Zhu |
| 7,260,384 B2 | 8/2007 | Bales et al. |
| 7,269,428 B1 | 9/2007 | Wallenius |
| 7,302,582 B2 | 11/2007 | Snapp |
| 7,321,773 B2 | 1/2008 | Hines |
| 7,330,899 B2 | 2/2008 | Wong |
| 7,333,480 B1 | 2/2008 | Clarke |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignano |
| 7,394,896 B2 | 7/2008 | Norton |
| 7,403,939 B1 | 7/2008 | Virdy |
| 7,412,049 B1 | 8/2008 | Koch |
| 7,424,293 B2 | 9/2008 | Zhu |
| 7,426,380 B2 | 9/2008 | Hines |
| 7,428,571 B2 | 9/2008 | Ichimura |
| 7,436,785 B1 | 10/2008 | McMullen |
| 7,440,442 B2 | 10/2008 | Grabelsky et al. |
| 7,453,990 B2 | 11/2008 | Welenson |
| 7,495,608 B1 | 2/2009 | Chen |
| 7,573,982 B2 | 8/2009 | Breen |
| 7,602,886 B1 | 10/2009 | Beech |
| 7,623,447 B1 | 11/2009 | Faccin |
| 7,711,094 B1 | 5/2010 | Olshansky |
| 7,747,258 B2 | 6/2010 | Farmer |
| 7,764,961 B2 | 7/2010 | Zhu |
| 7,783,297 B2 | 8/2010 | Ishii |
| 7,787,611 B1 | 8/2010 | Kotelly |
| 7,895,263 B1 | 2/2011 | Kirchmeier |
| 2001/0040886 A1 | 11/2001 | Jimenez |
| 2002/0077083 A1 | 6/2002 | Zellner |
| 2002/0077084 A1 | 6/2002 | Zellner |
| 2002/0077118 A1 | 6/2002 | Zellner |
| 2002/0077897 A1 | 6/2002 | Zellner |
| 2002/0085538 A1 | 7/2002 | Leung |
| 2002/0086676 A1 | 7/2002 | Hendry |
| 2002/0098832 A1 | 7/2002 | Fleischer et al. |
| 2002/0102996 A1 | 8/2002 | Jenkins |
| 2002/0118650 A1 | 8/2002 | Jagadeesan |
| 2002/0123327 A1 * | 9/2002 | Vataja ......................... 455/412 |
| 2002/0126656 A1 | 9/2002 | Park |
| 2002/0138650 A1 | 9/2002 | Yamamoto et al. |
| 2002/0158777 A1 | 10/2002 | Flick |
| 2002/0173317 A1 | 11/2002 | Nykanen |
| 2002/0191595 A1 | 12/2002 | Mar |
| 2003/0009277 A1 | 1/2003 | Fan |
| 2003/0012148 A1 | 1/2003 | Peters |
| 2003/0026245 A1 | 2/2003 | Ejzak |
| 2003/0044654 A1 | 3/2003 | Holt |
| 2003/0086539 A1 | 5/2003 | McCalmont |
| 2003/0108176 A1 | 6/2003 | Kung |
| 2003/0109245 A1 | 6/2003 | McCalmont |
| 2003/0118160 A1 | 6/2003 | Holt |
| 2003/0119528 A1 | 6/2003 | Pew |
| 2003/0186709 A1 | 10/2003 | Rhodes |
| 2004/0032485 A1 | 2/2004 | Stephens |
| 2004/0043775 A1 | 3/2004 | Kennedy |
| 2004/0047461 A1 | 3/2004 | Weisman et al. |
| 2004/0076277 A1 | 4/2004 | Kuusinen |
| 2004/0181689 A1 | 9/2004 | Kiyoto |
| 2004/0184584 A1 | 9/2004 | McCalmont |
| 2004/0185875 A1 | 9/2004 | Diacakis |
| 2004/0190497 A1 | 9/2004 | Know |
| 2004/0192271 A1 | 9/2004 | Eisner |
| 2004/0198386 A1 | 10/2004 | Dupray |
| 2004/0267445 A1 | 12/2004 | De Luca |
| 2005/0031095 A1 | 2/2005 | Pietrowics |
| 2005/0043037 A1 | 2/2005 | Ioppe |
| 2005/0053209 A1 | 3/2005 | D'Evelyn |
| 2005/0063519 A1 | 3/2005 | James |
| 2005/0074107 A1 | 4/2005 | Renner |
| 2005/0078612 A1 | 4/2005 | Lang |
| 2005/0083911 A1 | 4/2005 | Grabelsky |
| 2005/0101335 A1 | 5/2005 | Kelly |
| 2005/0107673 A1 | 5/2005 | Ball |
| 2005/0119012 A1 | 6/2005 | Merheb |
| 2005/0125376 A1 | 6/2005 | Curtis |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0174991 A1 | 8/2005 | Keagy |
| 2005/0192822 A1 | 9/2005 | Hartenstein |
| 2005/0201529 A1 | 9/2005 | Nelson |
| 2005/0213716 A1 | 9/2005 | Zhu |
| 2005/0232252 A1 | 10/2005 | Hoover |
| 2005/0238156 A1 | 10/2005 | Turner |
| 2005/0255857 A1 | 11/2005 | Kim |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0010200 A1 | 1/2006 | Mousseau |
| 2006/0023747 A1 | 2/2006 | Koren et al. |
| 2006/0026288 A1 | 2/2006 | Acharya |
| 2006/0068753 A1 | 3/2006 | Karpen |
| 2006/0077911 A1 | 4/2006 | Shaffer |
| 2006/0078094 A1 | 4/2006 | Breen |
| 2006/0088152 A1 | 4/2006 | Green |
| 2006/0120517 A1 | 6/2006 | Moon |
| 2006/0128395 A1 | 6/2006 | Muhonen |

| | | |
|---|---|---|
| 2006/0135177 A1 | 6/2006 | Winterbottom |
| 2006/0188083 A1 | 8/2006 | Breen |
| 2006/0193447 A1 | 8/2006 | Schwartz |
| 2006/0239205 A1 | 10/2006 | Warren |
| 2006/0250987 A1 | 11/2006 | White |
| 2006/0258380 A1 | 11/2006 | Liebowitz |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0019614 A1 | 1/2007 | Hoffmann |
| 2007/0022011 A1 | 1/2007 | Altberg |
| 2007/0026871 A1 | 2/2007 | Wager |
| 2007/0027997 A1 | 2/2007 | Polk |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0081635 A1 | 4/2007 | Croak |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0263610 A1 | 11/2007 | Mitchell |
| 2007/0270164 A1 | 11/2007 | Maier |
| 2008/0037715 A1 | 2/2008 | Prozeniuk |
| 2008/0045250 A1 | 2/2008 | Hwang |
| 2008/0063153 A1 | 3/2008 | Krivorot |
| 2008/0065775 A1 | 3/2008 | Polk |
| 2008/0117859 A1 | 5/2008 | Shahidi |
| 2008/0186164 A1 | 8/2008 | Emigh |
| 2008/0214202 A1 | 9/2008 | Toomey |
| 2008/0249967 A1 | 10/2008 | Flinn |
| 2010/0119049 A1 | 5/2010 | Clark |

FOREIGN PATENT DOCUMENTS

| | | |
|---|---|---|
| WO | WO2004/025941 | 3/2004 |
| WO | WO2005/051033 | 6/2005 |

OTHER PUBLICATIONS

Le-Pond Chin, Jyh-Hong Wen, Ting-Way Liu, The Study of the Interconnection of GSM Mobile Communication System over IP based Network, May 6, 2001, IEEE, Vehicular Technology Conference vol. 3, pp. 2219-2223.

Extended European Search Report from EPO in European Appl. No. 06827172.5 dated Dec. 29, 2009.

Location Based Services V2 Roaming Support (non proprietary), 80-V8470-2NP A, dated Jan. 27, 2005, pp. 1-56.

International Search Report received in PCT/US2011/001990 dated Apr. 24, 2012.

Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission,http://idahodispatch.com/index.php?option=com_documan&task=doc_download&gid=3&Itemid=7.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

International Search Report in PCT/US2007/23243 dated Apr. 2, 2008.

* cited by examiner

Consequential Watch Table

| Subscriber | Consequential Location Updates to also be provided to : |
|---|---|
| (555) 555-1212 | Application 2<br>Application 3 |
| (111) 111- 5555 | Application 2 |
| ⋮ | ⋮ |

301

303

305

CONSEQUENTIAL LOCATION DERIVED INFORMATION

This application claims priority from U.S. Appl. No. 60/367,708, entitled "Location Derived Presence Information," filed Mar. 28, 2002, to Hines et al.; U.S. Appl. No. 60/367,709, entitled "Consequential Location Services," filed Mar. 28, 2002, to Hines et al.; U.S. application Ser. No. 10/395,217, entitled "Location Derived Presence Information," filed Mar. 25, 2003, to Hines, et al.; and is a continuation application of U.S. application Ser. No. 10/400,639, now U.S. Pat. No. 7,120,450, entitled "Consequential Location Derived Information," filed Mar. 28, 2003 the entirety of all four of which are explicitly incorporated herein by reference.

BACKGROUND OF THE INVENTION

1. Field of the Invention

This invention relates generally to wireless communication carriers. More particularly, it relates to location-based services for the wireless industry.

2. Background of Related Art

Location information regarding subscribers is increasingly becoming available in a wireless network. This is particularly true in systems that comply with E-9-1-1 requirements. Location information relates to absolute coordinates of a wireless device.

Both Location and Presence services are message intensive on telecom networks. Message reduction in general is desirable, both to allow increased capacity in a wireless network, as well as to improve reliability of the system by reducing the number of messages.

FIG. 4 shows a conventional LoCation Services (LCS) request.

In particular, as shown in FIG. 4, a location server 106 requests location information regarding a particular mobile subscriber (MS) from a core network node, e.g., from a Mobile Switch Center (MSC) 110. Requested information regarding a particular wireless device (MS) may include, e.g., attach, detach, and location area update. The location server 106 may also request information regarding the wireless device such as attach, detach and/or location area update from a Packet Date Node (e.g., SGSN, GGSN, or PDSN), or help the device calculate x/y direction.

Typically, location information regarding a particular wireless device is requested of a home location register (HLR).

As shown in step 1 of FIG. 4, a locations services client sends a message to a location server.

In step 2, a location server 106 sends a Provide Subscriber Info message to a Home Location Register 108, requesting subscriber information regarding a particular subscriber.

In step 3, the carrier's Home Location Register (HLR) 108 provides the subscriber information for the requested subscriber back to the location server 106.

In step 4, location information regarding the requested subscriber is requested to either an MSC or Packet Data node 110. The MSC or Packet Data Node preferably provides precise location information using, e.g., a global positioning satellite (GPS), triangulation techniques, or other relevant locating technology, or helps the device calculate X/Y direction.

In step 5, the location request is forwarded to the Radio Access Network (RAN) 112 if needed.

In step 6, precise, updated location information regarding the requested subscriber is sent to the location server (LS) 106.

In step 7, an ultimate response to the original location request is sent to the LCS client 104 that initially requested the location information.

Others have proposed watching or monitoring locations of subscribers in a wireless network by "polling". The conventional polling technique utilizes a system within the wireless network to request updated location information relating to all provisioned subscribers. The polling is performed periodically, e.g., every N minutes.

However, polling is disadvantageous in that it is very resource intensive making it a costly solution for the business use cases it supports.

SUMMARY OF THE INVENTION

In accordance with the principles of the present invention, a method and apparatus provides presence and location information regarding a wireless device. Applications register with the system they are interested in presence and/or location information consequentially. A request for presence or location information is received by a potentially unrelated application, either through a direct request or as a polled request. The information is retrieved through standard practices and replied to the caller. As a consequence of the original presence or location request, the resultant information is also returned to the register applications. This greatly reduces the load placed on the wireless network since the registered applications received updated information without directly requesting the information.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
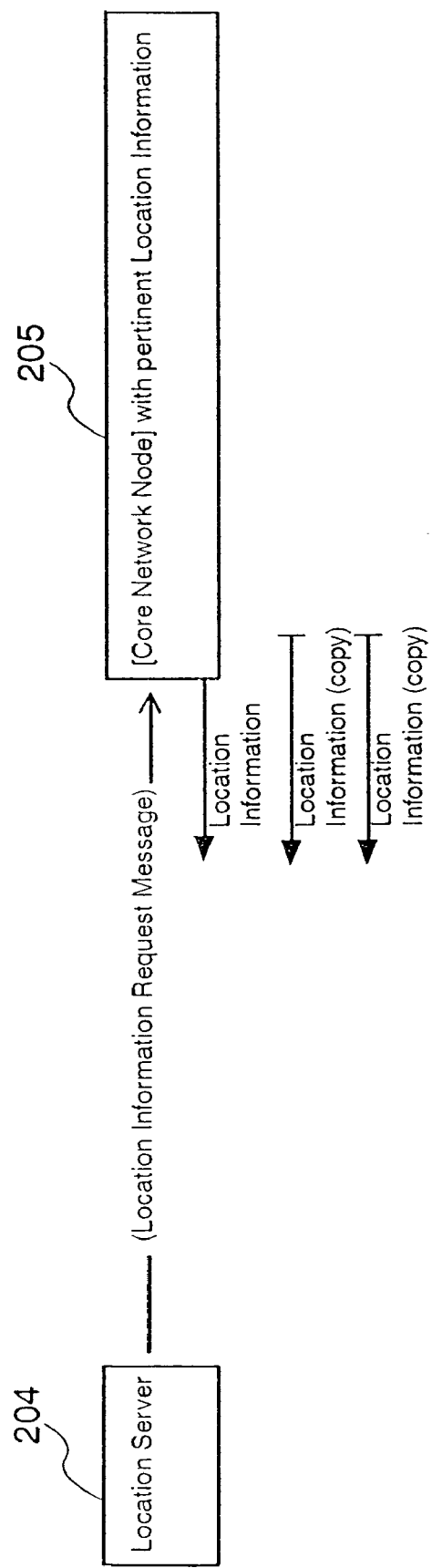
FIG. 1 shows generally a location request.

The present invention reduces the number of messages required in networks where location-based services are deployed.

Consequential Watch services in accordance with the principles of the present invention provides location information to one or more services OTHER than or in ADDITION to the service currently requesting location information, based on subscription to a suitable service, referred to herein as a consequential watch application. Of course, a suitable service may have any name other than consequential watch yet perform the same or similar function(s) as does the described consequential watch.

In the disclosed embodiments, a consequential watch service notifies one or more OTHER applications other than the particular application responsible for a latest location request, whenever location information for a particular subscriber is updated. A consequential watch application allows the avoidance of polling of subscribers for latest location information, and instead replaces polling as in conventional wireless systems with a monitoring and reporting service that reports to relevant applications that have previously requested monitoring service for the particular subscriber(s), even though those applications were not currently responsible for an update to the relevant subscriber's location information.

Thus, the disclosed consequential watch application notifies other applications or services, e.g., upon a request for update of a mobile subscriber's position, state, preferences or feature set, as a consequence of another service requesting location information (thus updating the location database at, e.g., a Location Server (LS)). Note that the other applications or services are not necessarily notified only when the particular subscriber changes location: but rather as a consequence of a different application or service requesting updated location information regarding that particular subscriber.

The present invention solves fundamental disadvantages of conventional wireless systems regarding location reporting. For instance, conventional wireless networks including a location-based service update location information on a scheduled, regular basis, i.e., using polling. However, polling of every single mobile subscriber in a mobile network is extremely resource intensive.

For example, if a mobile network has 10,000,000 subscribers, and a mere 5% of those 10,000,000 subscribers, or 500,000 actually use a location service requiring location tracking of their handset, the entire network would be subjected to location tracking. With 5-minute updating of each wireless device in the network this translates into a need to support 1,667 transactions per second. This puts a strain on the wireless network, and consumes valuable data bandwidth in the communications.

In accordance with a consequential watch system in accordance with the principles of the present invention, various applications or services will, from time to time, request an update of the location of a particular subscriber anyway. A consequential watch application reduces this redundancy by allowing entities in communication with the wireless network to subscribe to a consequential watch service wherein when a particular user's location information is updated in the Location Server (LS), then applications or services requesting location information upon update of that particular subscriber will also receive relevant, updated location information regarding the same wireless user.

The subscriber to the consequential watch service may be inside or outside the carrier's network.

For example, presume a wireless subscriber with a phone number, e.g., (206) 390-9150 is subscribed to, e.g., Starbucks Promotions, Yahoo! Messaging, & The Battle in Seattle (a multi-player mobile game), and that wireless subscriber (206) 390-9150 dials #777 to ask for the nearest Bank of America ATM, the location data update made for #777 will be pushed to the other three applications as a consequence of the #777 request and the functionality of the consequential watch.

FIG. 1 shows generally a location request to a core network node containing pertinent location information, resulting not only in a return of location information, but also in the spawning of presence information.

In particular, as shown in FIG. 1, a location server 204 requests location information regarding a particular mobile subscriber (MS) from a core network node 205, e.g., from a Mobile Switch Center (MSC). Requested information regarding a particular wireless device (MS) may include, e.g., attach, detach, and location area update. The location server 204 may also request information regarding the wireless device such as attach, detach and/or location area update from a Packet Date Node (e.g., SGSN, GGSN, or PDSN). The location server 204 may alternatively (or additionally) obtain location information directly from an appropriately equipped wireless device (e.g., a wireless device including a global positioning satellite (GPS) receiver.

Typically, location information regarding a particular wireless device is requested of a home location register (HLR). In accordance with the principles of the present invention, the home location register can also serve as a basis for presence services. Exemplary presence services may include, e.g., the state and/or status of a subscriber.

Importantly, in accordance with the present invention, information relating to an initial location request spawns or triggers the provision of additional location request information messages to subscribers to a consequential watch application or service.

Figure 2:
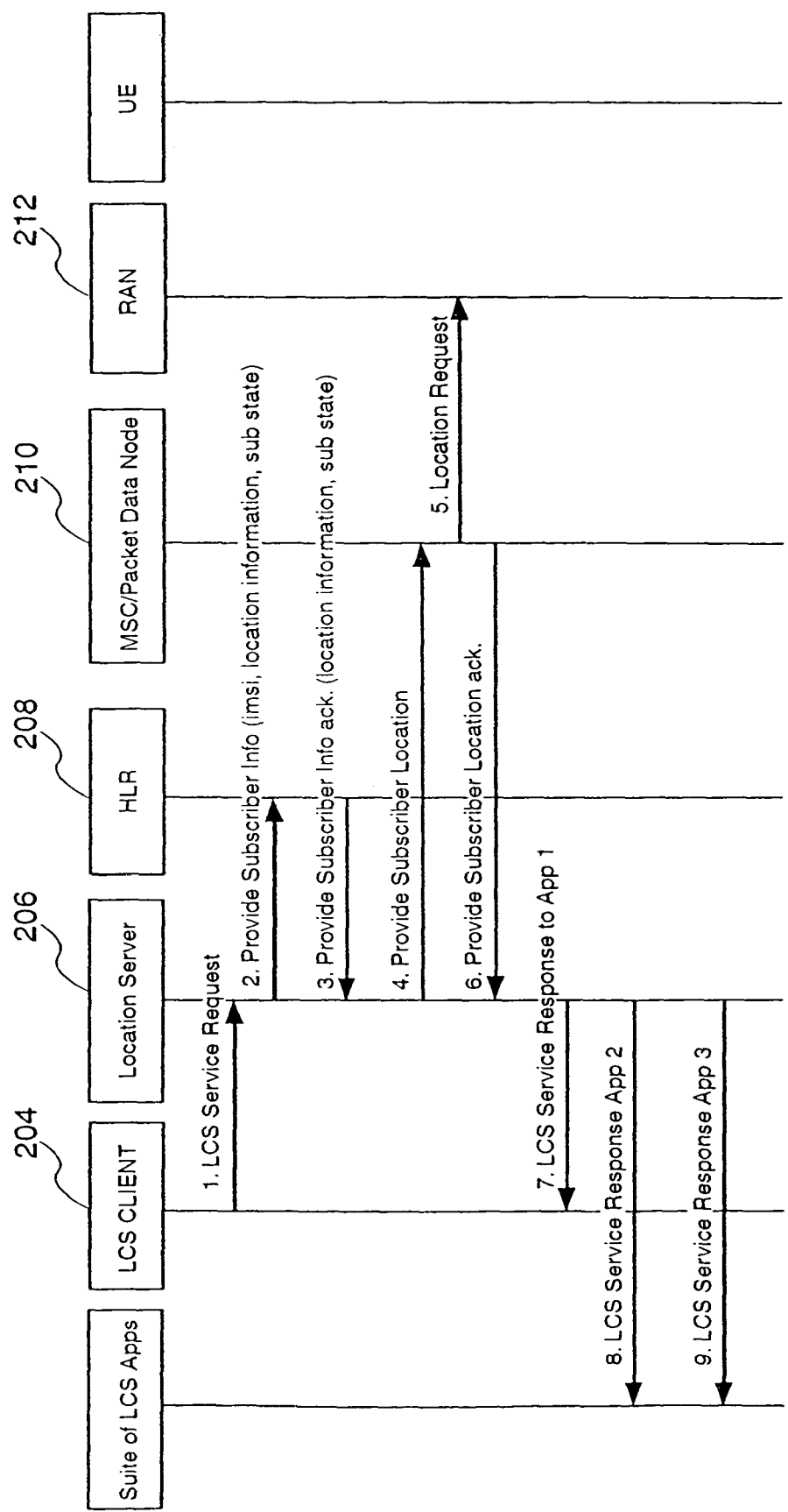
FIG. 2 shows an exemplary message flow of a LoCation Services (LCS) request, including a consequential watch application or service, in accordance with the principles of the present invention.

FIG. 2 shows an exemplary message flow of a LoCation Services (LCS) request between a location service client 204, a location server 206, a home location register (HLR) 208, a core network node such as an MSC or packet data node 210, and a radio access node (RAN) 212, including a consequential watch application or service located, e.g., in the location server 206, in accordance with the principles of the present invention. While the consequential watch application is located herein in association with a location server 206, the consequential watch application may be located in any suitable element sufficient to cause the provision of multiple location information messages in response to a single request.

In the exemplary embodiment, the messaging cycle is initiated (shown in step 1) by a location services client 204, that transmits a location request message to a location services server 206 in the relevant carrier's network.

In step 2, a location server 206 sends a Provide Subscriber Info message to a Home Location Register 208 (or other node containing subscriber identity information) regarding a particular subscriber. The Provide Subscriber Info message can request location information and/or subscriber state. In this use case, location information regarding a particular subscriber is requested, and within the same message, presence information such as subscriber state may also be requested. Requested presence information can include, e.g., idle, bust, not reachable, etc.

In step 3, the network node containing the location information (e.g., the carrier's Home Location Register (HLR) 208) provides the requested subscriber information for the requested subscriber back to the location server 206.

In step 4, the location services server 206 requests information regarding the relevant wireless user by message to either an MSC or Packet Data node 210. The MSC or Packet Data Node preferably provides precise location information using, e.g., a global positioning satellite (GPS), triangulation techniques, or other relevant locating technology. Alternatively, precise location information may be obtained from an appropriately equipped wireless device (e.g., a wireless device including a GPS receiver).

In step 5, the MSC or packet data node 210 requests updated location information of the wireless network, i.e., sending a request for current location information from a relevant node or application of the wireless network (e.g., from the Radio Access Network (RAN) 212).

The MSC, packet data node 110, Radio Access Network 212, etc. may determine a current location of the relevant wireless device using any suitable location technology, e.g., using a global positioning satellite (GPS) system, using triangulation, using angle of arrival, etc.

As part of the determination of a current location of the wireless device, as shown in Step 5, the location request may be forwarded to the relevant Radio Access Network 212. This would be necessary for certain locating technologies, e.g., for triangulation, angle of arrival, etc.) If a global positioning satellite system is utilized, the location request may be forwarded to a suitable GPS application in the wireless network that receives GPS location information regarding a relevant wireless device.

In step 6, a response to the update location information request including precise, updated location information regarding the requested subscriber is transmitted to the location services server (LS) 206. (The updated location information may also be forwarded to the HLR (not shown in FIG. 2) to update the current location of the relevant wireless device).

In step 7, an ultimate response to the original location request is sent to the LCS client 204 that initially requested the location information. This location information ideally includes current location information freshly obtained from the MSC 210 or other network node, but may instead be cached location information stored in the HLR 208 if the location information is not returned within a sufficient time window (e.g., causing a timeout). This would be the end of an otherwise conventional location request. However, the invention importantly continues on. In some applications, if desired, the process may end in the event of a timeout. However, the consequential provision of location information to subscribed other applications or services may be provided even in the event of a timeout waiting for new location information.

Step 8 particularly shows the advantages of a consequential location application or service, in accordance with the principles of the present invention.

In particular, in accordance with important principles of the present invention, although location information has already been provided to a requesting application or service, the same location information is also provided to one or more additional applications or services that have previously requested such information in the event of somebody else requesting information regarding the particular subscriber.

This 'freebie' location information is an important aspect of the present invention. For instance, an entirely separate application or service may register with a particular carrier for a consequential location service, perhaps by paying suitable fees, for the right to receive location information for those wireless devices that otherwise have location information retrieved. This avoids the need for the location server 206 to separately handle additional requests from each separate application desiring location information regarding the same subscriber(s).

Figure 3:
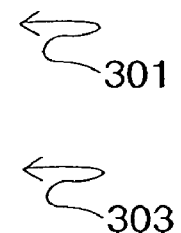
FIG. 3 shows an exemplary consequential watch table, in accordance with the principles of the present invention.
Figure 4:
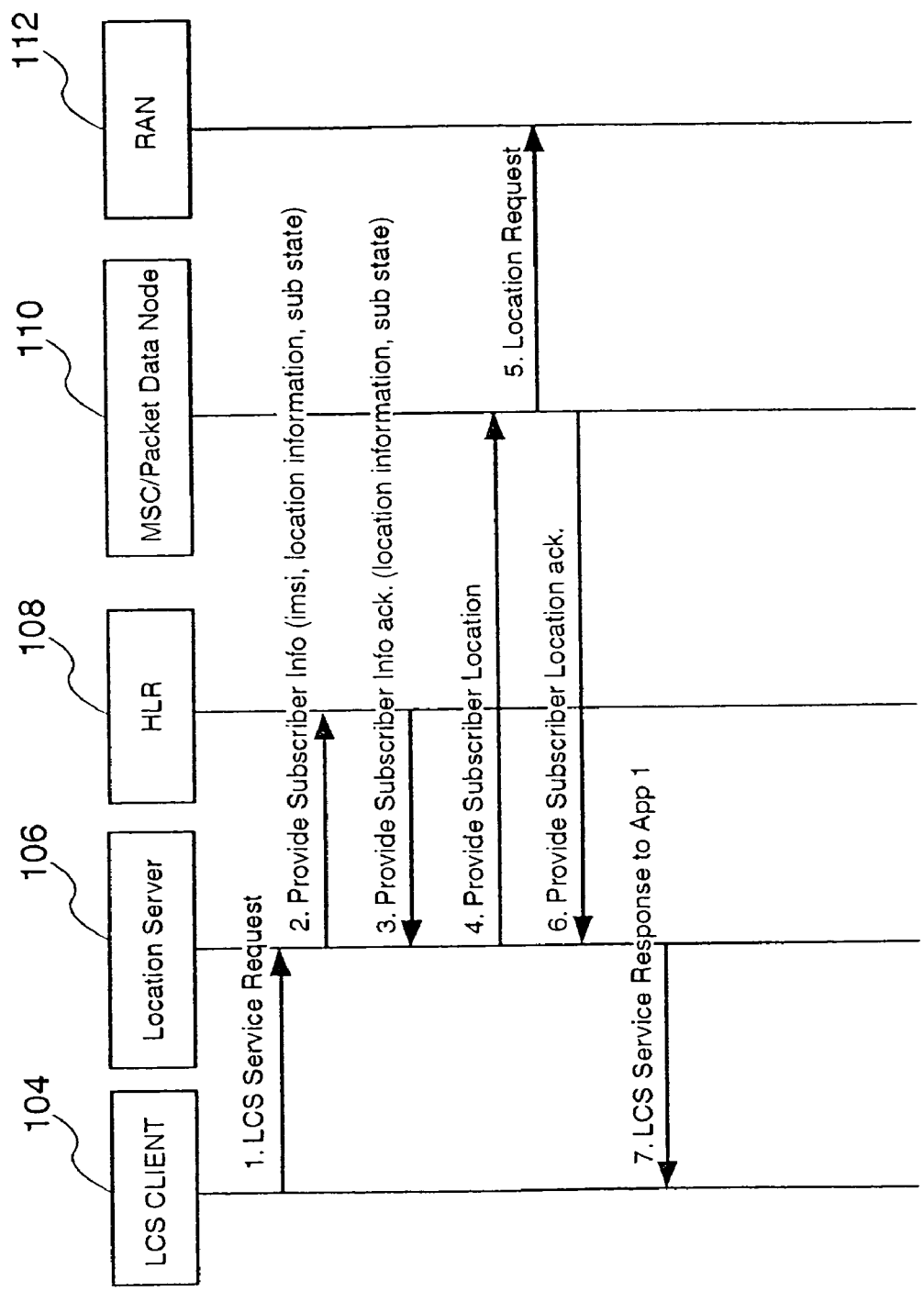
FIG. 4 shows a conventional LoCation Services (LCS) request.

FIG. 3 shows an exemplary consequential watch table 305, in accordance with the principles of the present invention.

In particular, FIG. 3 shows just one possible table associating unique subscriber identities (e.g., phone numbers) with one or more applications or services that desire to be provided with location information whenever the location information is already being provided to a different application or service.

FIG. 3 shows just two entries 301, 303 associating unique subscriber identities with applications or services subscribed to consequential watch services. Thus, application or services subscribing to a consequential watch service receives location information, avoiding the need for multiple messages otherwise required to update the same application with location information.

Applications or services may also be provided location updates by default, whenever location information regarding anyone in a particular subscriber group, or fitting particular aspects of subscribers, is provided.

As an example of consequential watch services, presume that Application 2 and Application 3 subscribe to a consequential watch service of a particular wireless carrier, as shown in FIG. 3. According to this example, the consequential watch is set up such that anytime the location of a particular subscriber (e.g., Subscriber (111) 111-5555) is updated in the location server (LS), Application 2 would be notified of the updated location by the relevant consequential watch application in addition to the initial requestor of the location information. Also according to this example, the consequential watch is further set up such that anytime the location of subscriber (555) 555-1212 is requested and provided by a location server, the same updated location information will also be provided to Application 2 and Application 3 without any further intervention or requests necessary by either Application 2 or Application 3.

Steps 8 and 9 show this latest example where location information, provided in response to a location request from one application, is also provided to Application 2 (Step 8) and also to Application 3 (Step 9).

The present invention provides benefits such as reducing core network messaging traffic, thus providing better system performance.

While the invention has been described with reference to the exemplary embodiments thereof, those skilled in the art will be able to make various modifications to the described embodiments of the invention without departing from the true spirit and scope of the invention.

What is claimed is:

1. A method of providing information regarding a wireless device, comprising:
    receiving, at a network node, a current request for location information regarding a wireless device;
    retrieving, from said network node, said location information regarding said wireless device; and
    in response to said current request for location information regarding said wireless device, triggering, by said network node, transmission of said location information regarding said wireless device to both a requesting application device and a non-requesting application device said location information is obtained in response to a network trigger generated in response to said wireless device moving from a first cell-site to a second cell site;
    wherein said non-requesting application device previously requested location information regarding said wireless device prior to said current request for location information.

2. The method of providing location information regarding a wireless device according to claim 1, wherein:
    said location information is current location information.

3. The method of providing location information regarding a wireless device according to claim 1, wherein:
    said location information is provided to at least two different applications separate from said wireless device associated with said requesting application device.

4. The method of providing location information regarding a wireless device according to claim 1, wherein:
    said location information is maintained in a home location register.

5. The method of providing location information regarding a wireless device according to claim 1, further comprising:
    requesting current location information regarding said wireless device from a core network node.

6. The method of providing location information regarding a wireless device according to claim 5, wherein said core network node comprises:
    a mobile switch center.

7. The method of providing location information regarding a wireless device according to claim 1, further comprising:

obtaining last known location information regarding said wireless device to return as said location information.

8. The method of providing location information regarding a wireless device according to claim 1, wherein:
said location information is obtained from cached memory.

9. The method of providing location information regarding a wireless device according to claim 1, wherein:
said location information is obtained from a radio access network.

10. The method of providing location information regarding a wireless device according to claim 1, wherein:
said location information is obtained from a global positioning satellite (GPS) system.

11. Apparatus for providing information regarding a wireless device, comprising:
means for receiving, at a network node, a current request for location information regarding a wireless device;
means for retrieving, from said network node, said location information regarding said wireless device said means for retrieving obtains said location information in response to a network trigger generated in response to said wireless device moving from a first cell-site to a second cell-site; and
means for triggering, by said network node, transmission of said location information regarding said wireless device to both a requesting application device and a non-requesting application device, said transmission being triggered in response to said current request for location information regarding said wireless device;
wherein said non-requesting application device previously requested location information regarding said wireless device prior to said current request for location information.

12. The apparatus for providing location information regarding in a wireless device according to claim 11, wherein:
said means for providing location information provides said location information to at least two different applications separate from said wireless device associated with said requesting application device.

13. The apparatus for providing location information regarding in a wireless device according to claim 11, wherein:
said location information is maintained in a home location register.

14. The apparatus for providing location information regarding in a wireless device according to claim 11, further comprising:
means for requesting current location information regarding said wireless device from a core network node.

15. The apparatus for providing location information regarding in a wireless device according to claim 11, wherein said core network node comprises:
a mobile switch center.

16. The apparatus for providing location information regarding in a wireless device according to claim 11, further comprising:
means for obtaining last known location information regarding said wireless device to return as said location information.

17. The apparatus for providing location information regarding in a wireless device according to claim 11, wherein:
said means for providing location information obtains said location information from cached memory.

18. The apparatus for providing location information regarding in a wireless device according to claim 11, wherein:
said means for providing location information obtains said location information from a radio access network.

19. The apparatus for providing location information regarding in a wireless device according to claim 11, wherein:
said means for providing location information obtains said location information from a global positioning satellite (GPS) system.

20. The apparatus for providing location information regarding in a wireless device according to claim 11, wherein:
said location information is current location information.

* * * * *